US006309010B1

(12) United States Patent
Whitten

(10) Patent No.: US 6,309,010 B1
(45) Date of Patent: Oct. 30, 2001

(54) COLLAPSIBLE STREAMLINED TAIL FOR TRUCKS AND TRAILERS

(76) Inventor: W. David Whitten, 995 Stonehenge Dr., Tipp City, OH (US) 45371

( * ) Notice: Subject to any disclaimer, the term of this patent is extended or adjusted under 35 U.S.C. 154(b) by 0 days.

(21) Appl. No.: 09/670,532

(22) Filed: Sep. 27, 2000

Related U.S. Application Data

(60) Provisional application No. 60/156,603, filed on Sep. 29, 1999.

(51) Int. Cl.[7] ................................................... B62D 35/00
(52) U.S. Cl. ..................................... 296/180.4; 296/180.1
(58) Field of Search ............................ 296/180.1, 180.2, 296/180.3, 180.4, 180.5, 1.1

(56) References Cited

U.S. PATENT DOCUMENTS

| 4,142,755 | 3/1979 | Keedy . |
| 4,236,745 | 12/1980 | Davis . |
| 4,257,641 | 3/1981 | Keedy . |
| 4,451,074 | 5/1984 | Scanlon . |
| 4,508,380 | 4/1985 | Sankrithi . |
| 4,741,569 | * 5/1988 | Sutphen ............................ 296/180.4 |
| 4,818,015 | 4/1989 | Scanlon . |
| 4,978,162 | 12/1990 | Labbé . |
| 5,058,945 | * 10/1991 | Elliott, Sr. et al. ............... 296/180.5 |
| 5,190,342 | 3/1993 | Marlowe et al. . |
| 5,236,347 | 8/1993 | Andrus . |
| 5,348,366 | 9/1994 | Baker et al. . |
| 5,498,059 | 3/1996 | Switlik . |
| 5,609,384 | 3/1997 | Loewen . |
| 5,823,610 | 10/1998 | Ryan et al. . |

FOREIGN PATENT DOCUMENTS

2509681 * 1/1983 (FR) ................................. 296/180.4

OTHER PUBLICATIONS

Gutierrez, et al., "Aerodynamics Overview of the Ground Transportation Systems (GTS) Project for Heavy Vehicle Drag Reduction,"*SAE Technical Paper Series*, No. 960906, 1996, (pp. 219–236).
Cooper, "The Wind Tunnel Testing of Heavy Trucks to Reduce Fuel Consumption,"*SAE Technical Paper Series*, No. 821285, Nov. 1982, (pp. 1–13).
Saltzman, et al., "A Reassessment of Heavy–Duty Truck Aerodynamic Design Features and Priorities", *NASA/TP–1999–206574*, Jun. 1999, (pp. 1–32).

* cited by examiner

*Primary Examiner*—Stephen T. Gordon
*Assistant Examiner*—Jason Morrow
(74) *Attorney, Agent, or Firm*—Biebel & French

(57) ABSTRACT

A deployable airfoil to reduce wind resistance of trucks and semi-trailers including first and second frame structures supported for pivotal movement at the rear of the truck. Each of the first and second frame structures include a pair of frame members including upper and lower frame members. The upper and lower pairs of frame members are connected through an actuation mechanism whereby the upper and lower frame members will move simultaneously to deploy or fold the airfoil. Each pair of upper and lower frame members support a fabric member wherein, in a deployed configuration, the fabric member is drawn substantially taut between the upper and lower frame members.

19 Claims, 11 Drawing Sheets

COLLAPSIBLE STREAMLINED TAIL FOR TRUCKS AND TRAILERS

CROSS-REFERENCE TO RELATED APPLICATION

This Application claims the benefit of U.S. Provisional Application Serial No. 60/156,603, filed Sep. 29, 1999, which application is incorporated herein by reference.

BACKGROUND OF THE INVENTION

1. Field of the Invention

The present invention relates generally to aerodynamic devices for use with vehicles, such as trucks and semi-trailers, and in particular relates to an aerodynamic wind drag reduction device or airfoil for attachment to the rear of a truck or trailer by means of a collapsible frame.

2. Description of the Prior Art

The shape of conventional trucks and semi-trailers is dictated by a need to provide a large cargo volume within maximum allowable dimensions, and generally results in vehicles which sacrifice aerodynamic efficiency to obtain maximum cargo volume. Various devices have been proposed to increase the aerodynamic efficiency for trucks and trailers, including aerodynamic airfoils attached to the roof of trucks for pulling trailers, as well as devices for attachment to the rear of trailers to provide a streamlined shape in order to reduce the effects of the low pressure region created at the rear of the trailer.

Common problems addressed by prior art aerodynamic devices for attachment to the rear of trailers include accommodating the need for proper access to the rear of the trailer to permit loading and unloading of cargo. Accordingly, many prior art devices provide various mechanisms for providing folding frames to define the contour of the airfoil, or for providing an inflatable airfoil which collapses when the vehicle is not in motion. A further problem associated with such devices includes providing a convenient mechanism for extending and retracting the airfoil and which will not unduly alter the structure of the trailer or require extensive modifications.

Accordingly, there is a continuing need for an airfoil for use with a truck or semi-trailer to reduce aerodynamic drag and which requires a minimum number of moving parts resulting in easier and faster deployment and in a reduced cost. There is a further need for such a device in which the airfoil may be incorporated into vehicles having either pivoted doors or roll up door closures.

SUMMARY OF THE INVENTION

The present invention provides a deployable airfoil to reduce wind resistance of trucks and semi-trailers being constructed with a substantially planar rear surface. The device includes first and second substantially rigid frame structures supported at the plane of the rear surface for the truck or semi-trailer. Each frame structure includes a proximal edge pivotally mounted adjacent to the plane of the rear surface, and a distal edge movable outwardly from a location adjacent the rear surface to a location distal from the rear surface.

A flexible fabric structure is attached to the distal edges of the frame structure and extends between the first and second frame structures. A connecting structure is additionally provided between the first and second frame structures whereby the frame structures are connected to pivot simultaneously outwardly to move the fabric structure from a folded configuration adjacent to the rear surface to a deployed configuration where the fabric structure is substantially taut between the first and second frame structures.

In a further aspect of the invention, the first frame structure comprises a pair of upper frame members and the second frame structure comprises a pair of lower frame members wherein an upper frame member is paired with a lower frame member to define a left hand pair of frames and the other upper frame member and lower frame member are paired to form a right hand pair of frames. The distal edges of the frame structures are defined by distal edges of the frame members, and the distal edges of the upper and lower frame members pivot outwardly in opposite directions during movement from the folded configuration to the deployed configuration.

In another aspect of the invention, the connecting structure comprises first and second elongated lever structures connected to the first and second frame structures, respectively. The first and second lever structures each include a proximal end supported for movement adjacent to the rear surface of the truck and a distal end attached to a respective frame structure. In particular, the first lever structure comprises a pair of upper frame levers, and the second lever structure comprises a pair of lower frame levers, each of the levers being connected to a respective frame member at distal ends of the frame levers. Proximal ends of the frame levers are guided for substantially linear movement adjacent and parallel to the rear surface wherein actuation of the proximal ends in movement causes the distal ends of the frame levers to force the frame members outwardly to the deployed configuration.

In yet another aspect of the invention, the proximal ends of the frame levers associated with each of the left hand and right hand pair of frame members are connected to each other through a flexible cable whereby the pairs of frame levers move simultaneously to simultaneously move the pairs of left hand or right hand frame members in deploying or retracting the airfoil. It should be noted that references to a flexible cable throughout this application are intended to include cables, chains, V-belts, or equivalent structures.

Therefore, it is an object of the present invention to provide an airfoil capable of being deployed from a folded configuration to a deployed configuration.

It is another object of the invention to provide such an airfoil with frame members supporting a flexible fabric structure wherein pivotal movement of the frame members causes folding and deployment of the fabric structure.

It is an additional object of the invention to provide a folding airfoil structure including an actuation mechanism for efficiently deploying and folding the airfoil.

Other objects and advantages of the invention will be apparent from the following description, the accompanying drawings and the appended claims.

DETAILED DESCRIPTION OF THE PREFERRED EMBODIMENT

Figure 1:
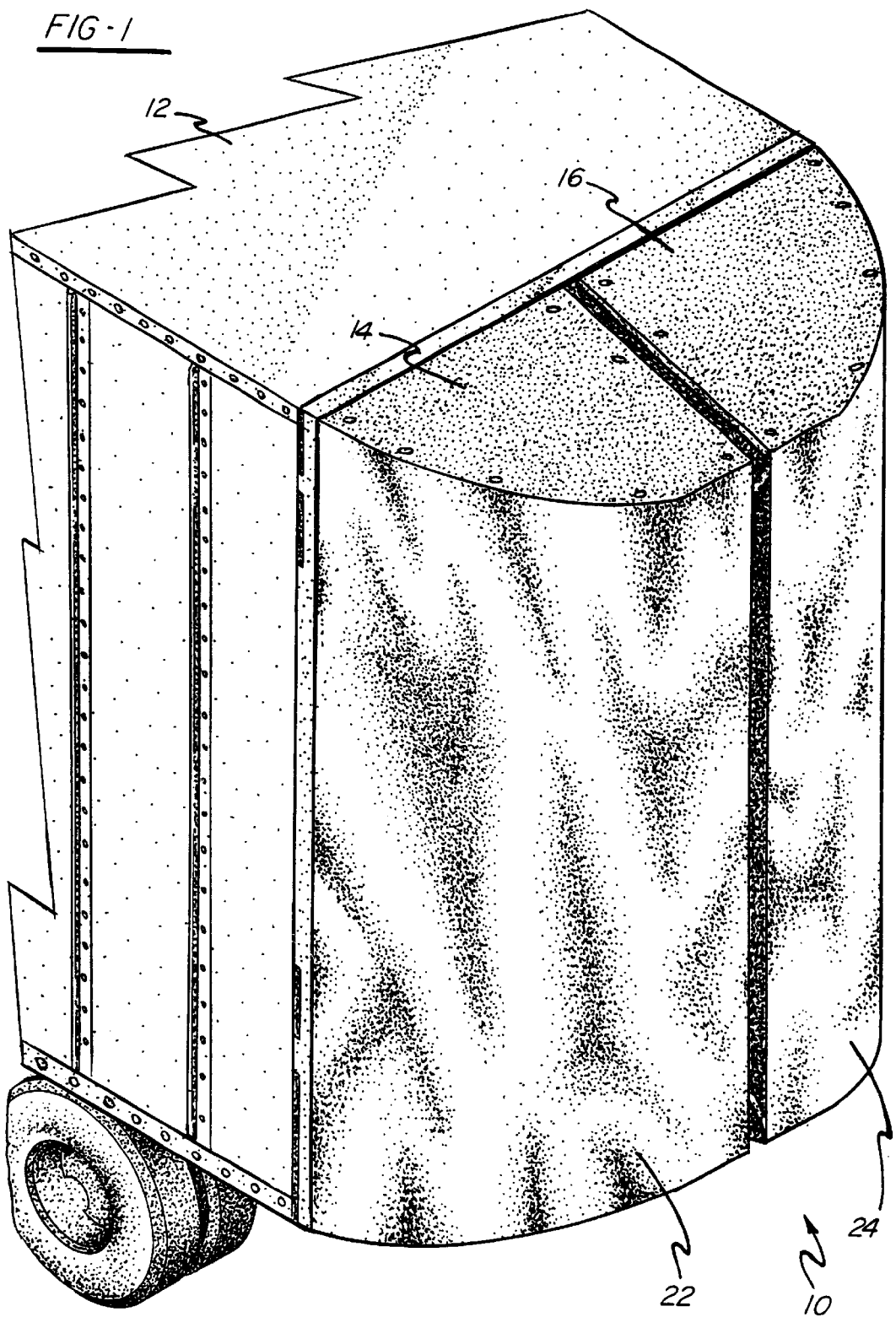
FIG. 1 is a rear perspective view of a truck incorporating the airfoil of the present invention with the airfoil in a deployed configuration.
Figure 2:
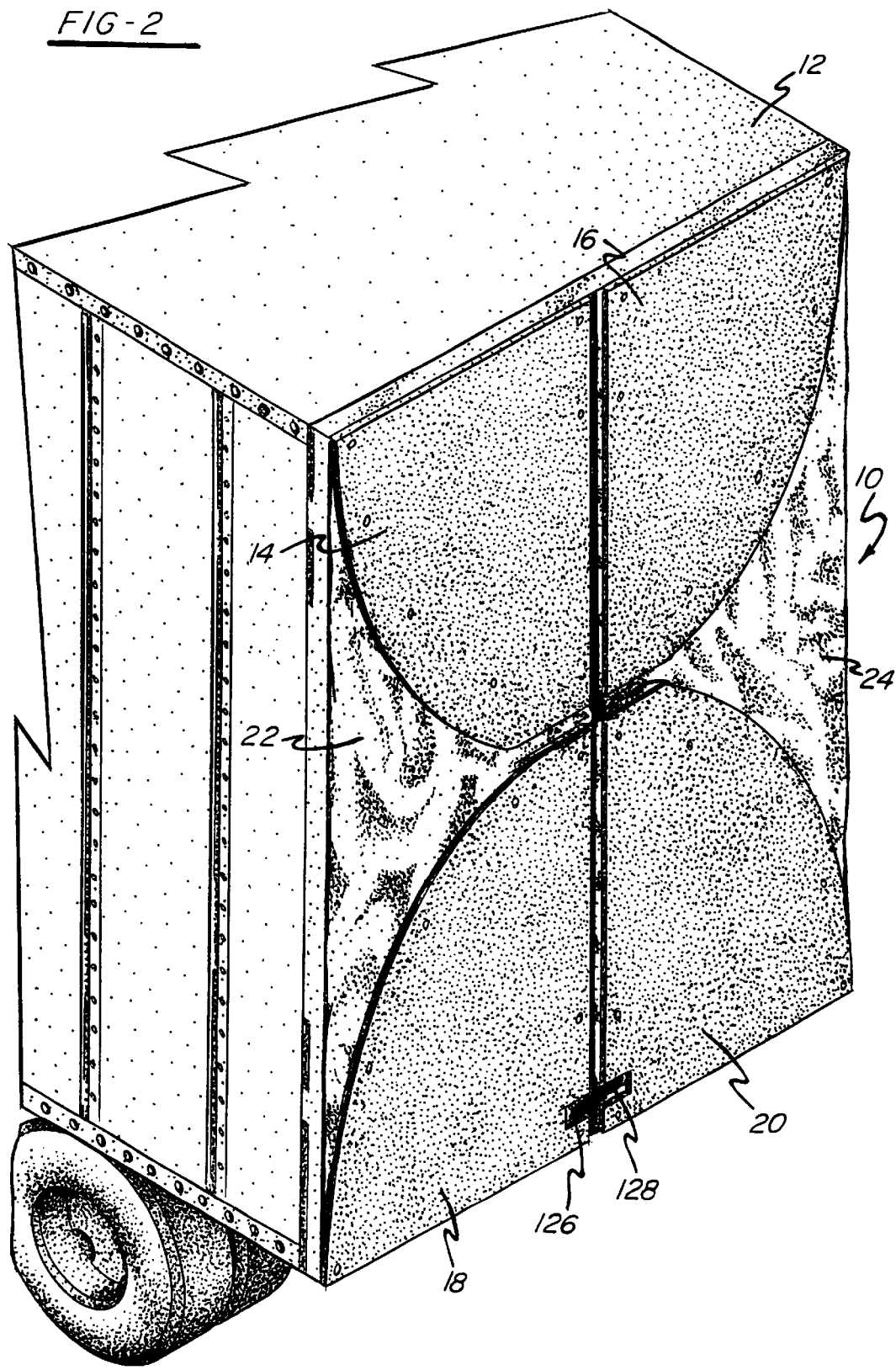
FIG. 2 is a rear perspective view of a truck incorporating the airfoil of the present invention with the airfoil in a folded configuration.

Referring to FIGS. 1 and 2, the present invention provides an airfoil 10 for attachment to the rear of a truck or semi-trailer 12, hereafter collectively referred to as truck 12. The airfoil 10 provides a reduced wind drag on the rear of the truck wherein the truck 12 includes a substantially planar rear surface. The airfoil 10 includes a first pair of upper panels 14, 16, and a second pair of lower panels 18, 20 wherein the panels 14, 16, 18, 20 are generally shaped as quarter sectors of a circle which, in the embodiment illustrated, include truncated sectors to form a truncated boattail shape when the airfoil 10 is deployed. In addition, a pair of flexible fabric structures or members 22, 24 extend between the first, upper panels 14, 16 and the second, lower panels 18, 20.

FIG. 1 illustrates the airfoil 10 located in a deployed configuration with the first, upper panels 14, 16 and second, lower panels 18, 20 spaced from the rear surface of the truck 12, and the fabric members 22, 24 drawn taut between the upper panels 14, 16 and lower panels 18, 20.

FIG. 2 illustrates a folded configuration for the airfoil 10 wherein the upper panels 14, 16 and the lower panels 18, 20 are positioned adjacent the rear surface of the truck 12 with the fabric members 22, 24 folded in and held in position adjacent the rear surface of the truck 12.

Figure 3:
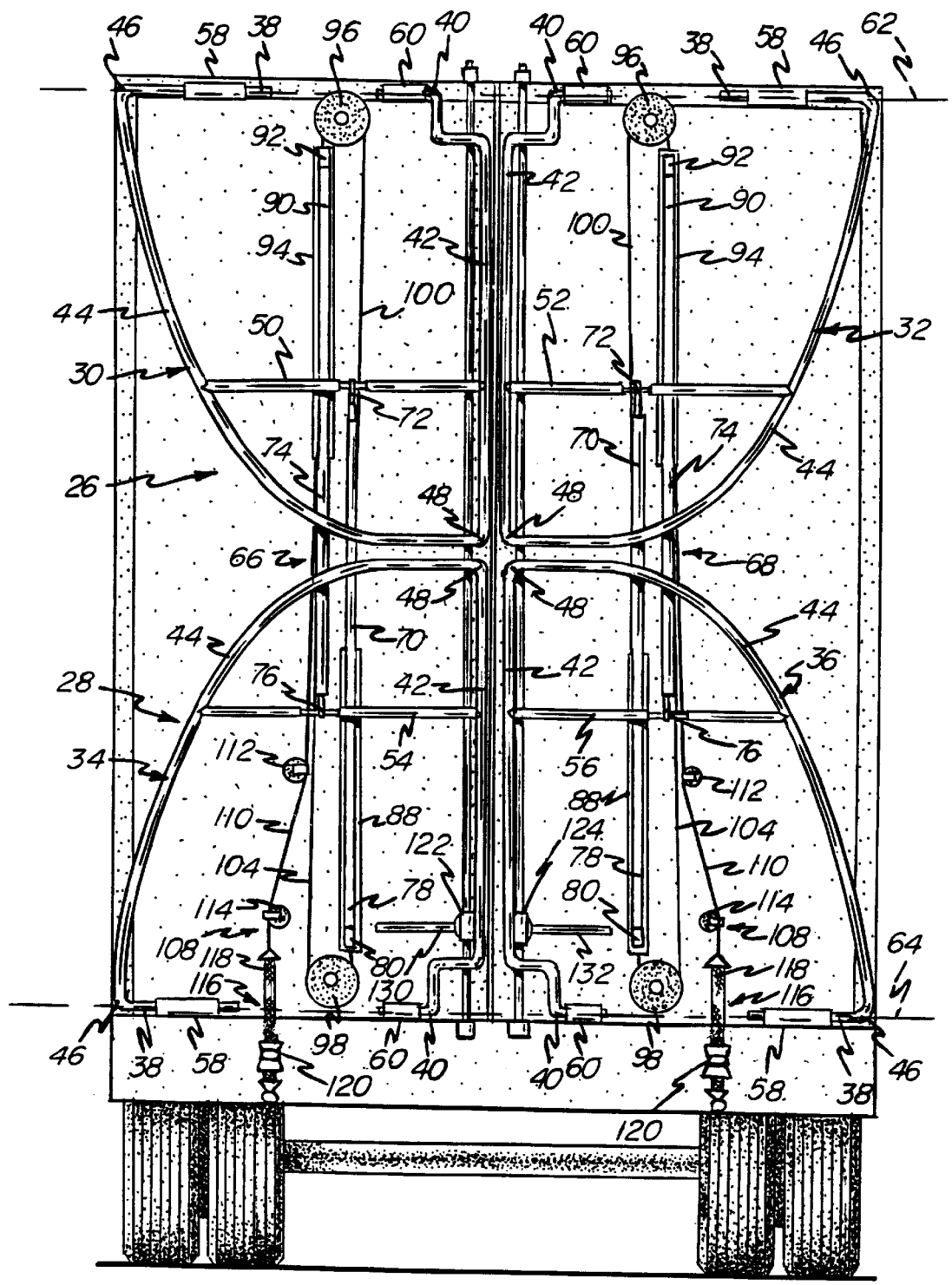
FIG. 3 is a rear elevational view of a truck incorporating the airfoil of the present invention and shown without the upper and lower panel members and the fabric structure.
Figure 4:
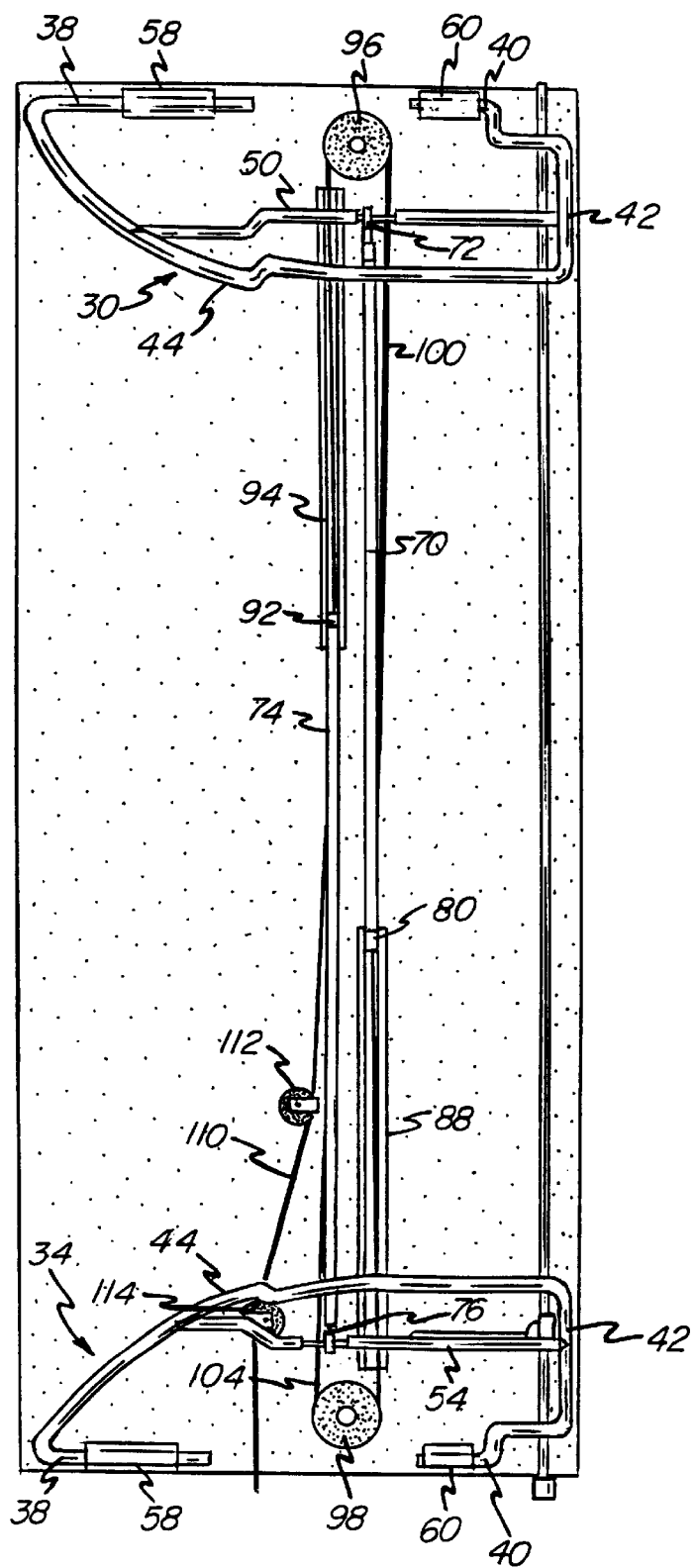
FIG. 4 is an enlarged view of the left hand side of the frame structure for the airfoil with the frame structure positioned in the deployed configuration.
Figure 5:
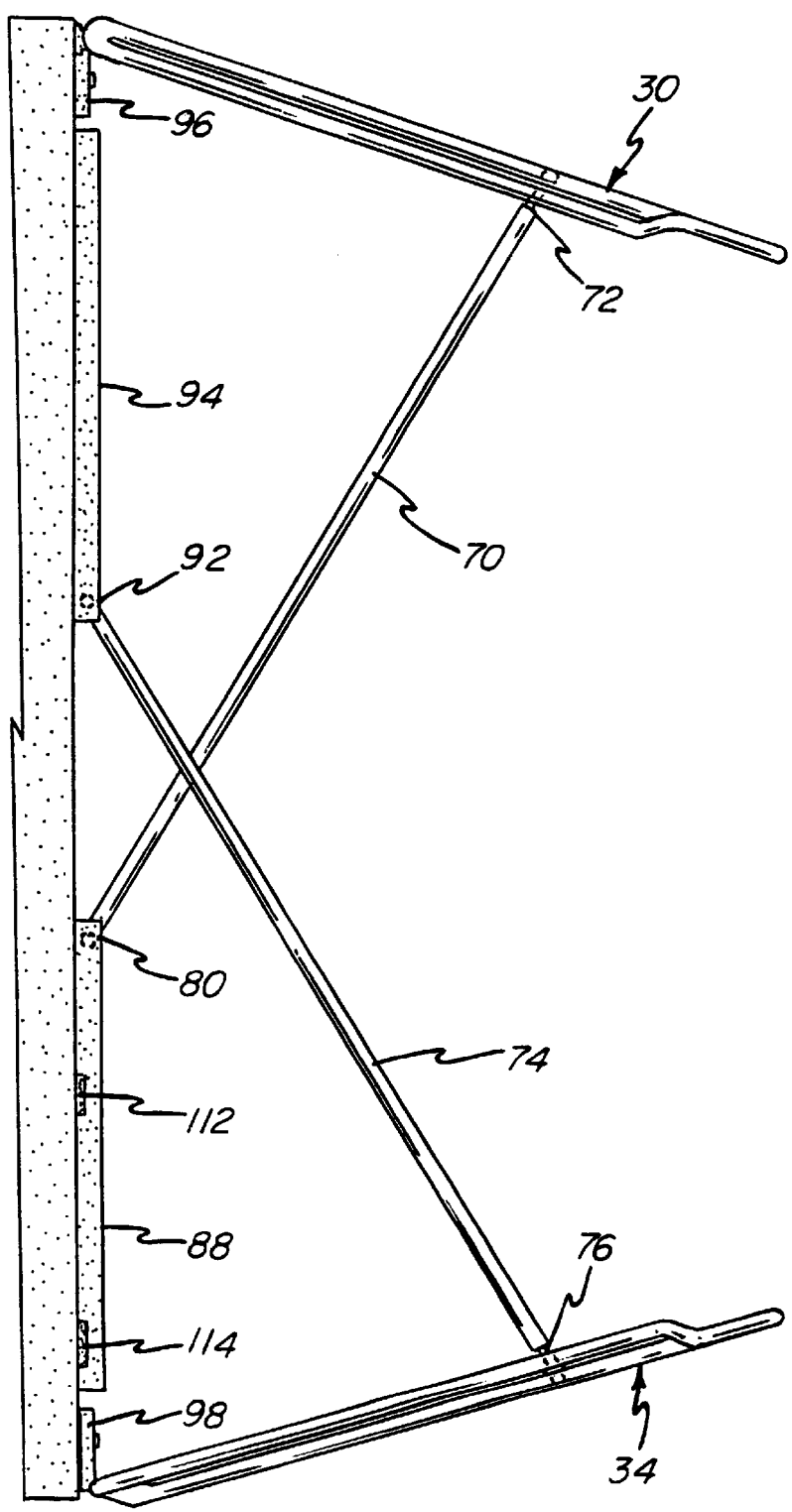
FIG. 5 is a side elevational view of the left hand side frame structure shown in the deployed configuration.

Referring to FIGS. 3–5, the upper and lower panels 14, 16, 18, 20 and fabric members 22, 24 are supported on a frame structure mounted to the rear of the truck 12. In particular, the frame structure includes first and second substantially rigid frame structures 26, 28 wherein the first frame structure 26 includes a pair of upper frame members 30, 32 and the second frame structure 28 includes a pair of lower frame members 34, 36.

In the preferred embodiment, the frame members 30, 32, 34, 36 are formed with the same frame elements, each including a proximal edge defined by a pair of parallel, axially aligned legs 38, 40, a substantially straight central edge 42 extending perpendicular to the proximal edge, and a generally arcuate distal edge 44 extending between an end 46 of the proximal edge and an end 48 of the central edge 42.

Each of the frame members 30, 32, 34, 36 further include a respective transverse support member 50, 52, 54, 56 extending between the central edge 42 and the distal edge 44. In addition, the proximal edges of the first and second upper frame members 30, 32 are supported by bearing members 58, 60, engaged with the legs 38, 40, to support the upper frame members 30, 32 for pivotal movement about an upper horizontal axis 62. Similarly, the first and second lower frame members 34, 36 include bearing members 58, 60 engaged with the legs 38,40 to support the lower frame members 34, 36 for pivotal movement about a lower horizontal axis 64.

The left hand pair of frame members 30, 34 and right hand pair of frame members 32, 36 are each provided with a respective actuation mechanism 66, 68 wherein the actuation mechanisms 66, 68 are substantially identical to each other in structure and operation, and will be described with particular reference to the left hand actuation mechanism 66 for moving the frame members 30 and 34. The actuation mechanism 66 includes a first elongated frame lever 70 having a distal end 72 pivotally attached to the transverse member 50 of the upper frame member 30, and a second elongated frame lever 74 having a distal end 76 pivotally attached to the transverse member 54 of the lower frame member 34.

Figure 6B:
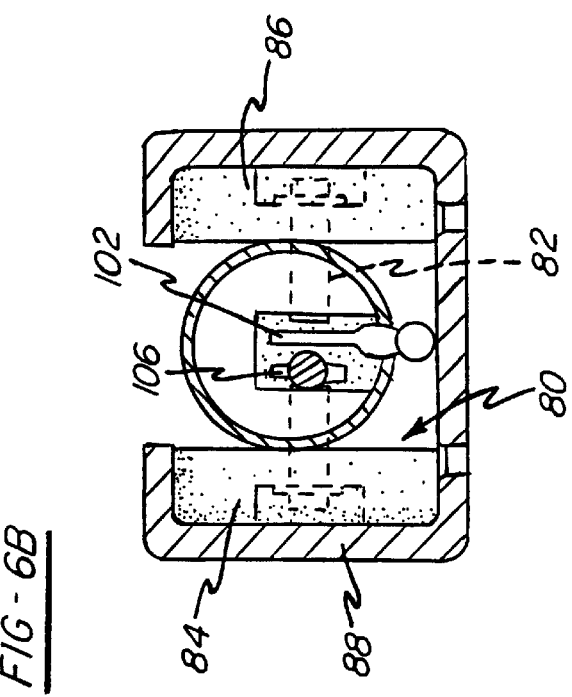
FIG. 6B is an end view of a frame lever guide illustrating a roller assembly within the frame lever guide.

The first frame lever 70 includes a proximal end 78 including a roller assembly 80 wherein the roller assembly comprises a shaft 82 passing through the proximal end 78 and supporting a pair of rollers 84, 86 (see also FIG. 6B). The rollers 84, 86 are supported for rolling movement within a channel shaped first frame lever guide 88 whereby the proximal end 78 of the first frame lever 70 is supported for linear movement parallel to a plane defined by the rear surface of the truck 12. It should be noted that the frame lever guide 88 may be mounted directly to the left hand rear door 89 of the truck, where the present invention is incorporated into a truck having rear swinging doors.

The second frame lever 74 includes a proximal end 90 supporting a roller assembly 92 which is identical in structure to the roller assembly 80 and which is guided in linear movement along a lower frame lever guide 94.

The actuation mechanism 66 further includes an upper pulley 96 located adjacent to an upper end of the lower frame lever guide 94, and a lower pulley 98 located adjacent a lower end of the upper frame lever guide 88, the pulleys 96, 98 are supported for rotation and are preferably attached to the rear door surface of the truck.

Figure 6A:
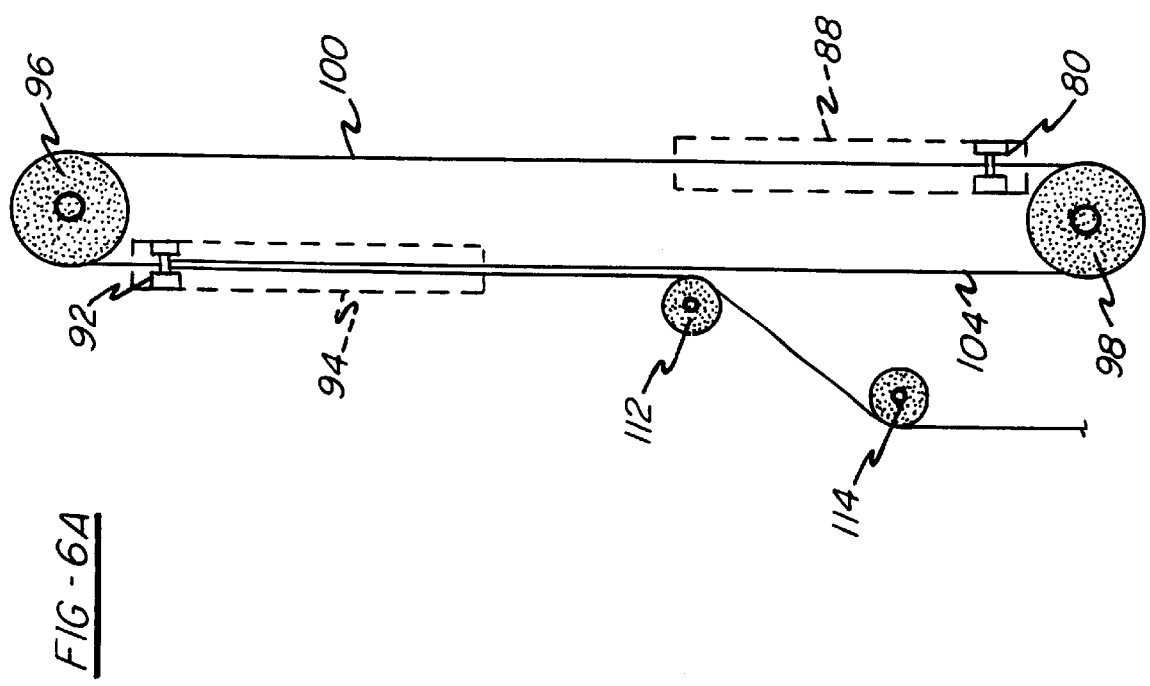
FIG. 6A is a schematic illustrating the cable actuation mechanism for the airfoil.

Referring further to FIGS. 6A and 6B, the actuation mechanism 66 additionally includes an upper cable section 100, which is preferably a V-belt to avoid slippage with pulley 98, wherein the upper cable section 100 is attached to the shaft 82 at a cable eye fitting 102 and extends around the upper pulley 96 to a similar attachment point on the roller assembly 92. In addition, a lower cable section 104 extends from a cable eye fitting attachment point 106 on the roller assembly 80, around the lower pulley 98 to a similar attachment point on the roller assembly 92. Thus, the upper cable 100 and lower cable 104 define a drive circuit for connecting the roller assemblies 80, 92 for simultaneous movement whereby the frame levers 70, 74 will simultaneously move the frame members 30, 34 outwardly to a deployed position, as seen in FIGS. 4 and 5, or will retract the frame members 30, 34 to a retracted or folded position, as illustrated in FIG. 3.

The actuation mechanism 66 further includes an actuator 108 for actuating the drive circuit in movement to move the upper and lower frame members 30, 34 to the deployed position. The actuator 108 includes a cable 110 having an upper end attached to the roller assembly 92, and extends around guide pulleys 112, 114 to a tensioning strap assembly 116. The tensioning strap assembly 116 comprises a strap 118 and a conventional strap tensioner 120 which is connected to a structural member of the truck, such as a bumper 121. Thus, the upper and lower frame members 30, 34 are deployed by pulling downwardly on the strap 118 which in turn draws the roller assembly 92 downwardly along the lever guide 94 and causes simultaneous upward movement of the roller assembly 80 within the lever guide 88. The tensioner 120 is used to tension the fabric member 22 (not shown in FIG. 3) attached between the distal edges 44 of the upper and lower frame members 30, 34 whereby the fabric member 22 is drawn taut and forms a curved airfoil surface extending from the back of the truck 12.

Retraction or folding of the airfoil is accomplished by releasing the tensioner 120 and pushing one or both of the frame members 30, 34 to cause the frame members 30, 34 to pivot toward the rear surface of the truck.

It should be understood that the right hand upper and lower frame members 32, 36, mounted to a right hand door 123 of the truck, operate under actuation of the actuation mechanism 68 to draw the fabric member 24 taut in a manner similar to that described for the left hand structure, and components of the right hand actuation mechanism 68 corresponding to the components of the left hand actuation mechanism 66 are labeled with the same reference numerals as their corresponding components.

It should additionally be noted that the airfoil of the present invention is designed such that it permits operation of the conventional lock or latching structure 122, 124 for the doors of the truck 12. In particular, referring to FIG. 2, the lower panels 18, 20 are each provided with a slot 126, 128 corresponding to the location of the handles 130, 132 (FIG. 3) whereby an operator may reach through the panels 18, 20 to operate the truck doors. In addition, the cut out areas 126, 128 may be covered by a hinged door or provided with a bristle structure permitting passage of an operator's hand therethrough and facilitating air flow over the panels 18, 20.

Figure 7:
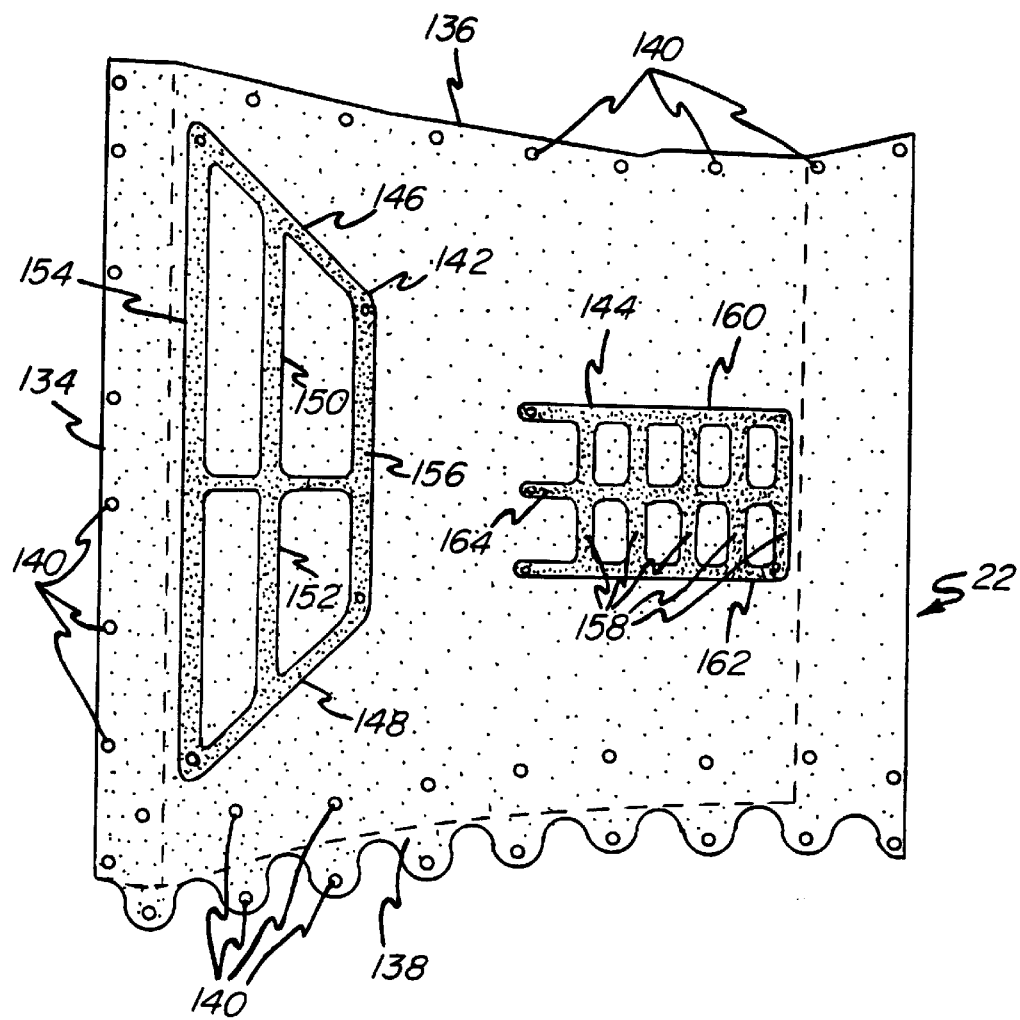
FIG. 7 is a plan view of one of the fabric members for use in constructing the airfoil and including a stiffening member for facilitating preferential bending of the fabric member.

Referring to FIG. 7, details of an improved fabric member 22, 24 is illustrated, and will be described with particular reference to the left hand fabric member 22. The fabric member 22 includes a side edge 134 for attachment to the side of the truck 12, a top edge 136 for attachment to the distal edge 44 of the upper frame member 30, and a lower edge 138 for attachment to the distal edge 44 of the lower frame member 34 wherein a plurality of holes 140 are provided to facilitate attachment of the fabric member 22 to the corresponding adjacent structures.

As the fabric member 22 is folded during movement of the upper and lower frame members 30, 34 toward the rear surface of the truck 12, the fabric member 22 will normally tend to wrinkle and fold and, under normal conditions, may not fold to a desired orientation where substantially all of the fabric member 22 is placed adjacent the rear surface of the truck 12 and folded behind both of the upper and lower frame members 30, 34. In order to facilitate proper folding of the fabric member 22, a pair of folding guides 142, 144 are provided comprising stiffening panels attached to the fabric member 22. The folding guides 142, 144 are formed of a thin, semi-flexible material, such as thin sheet metal or plastic.

The folding guides 142, 144 are each designed such that they have a directionally dependent differential stiffness whereby the folding guides 142, 144 will have a greater resistance to bending about a horizontal axis than a resistance to bending about a vertical axis. Thus, the folding guides 142, 144 contribute vertical stiffness to the fabric member 22. It can be seen that the vertical stiffness for the folding guide 142 is derived from the shape of the guide 142 comprising a truncated triangular shape, formed by inwardly angled top and bottom edges 146, 148, in combination with cross members 150, 152 extending between the top and bottom edges 146, 148 and opposing side edges 154, 156.

The narrower folding guide 144 derives its stiffness by providing a plurality of vertical column members 158 extending between top and bottom edges 160, 162, and providing a single horizontal connecting member 164 extending parallel to the top and bottom edges 160, 162. Thus, the relatively greater number of vertical members 158 provide a greater resistance to bending than the horizontally extending members 160, 162, 164.

It should be understood that additional folding guide structures may be provided to stiffen the fabric members 22, 24 and provide differential stiffness between the horizontal and vertical directions for facilitating folding the fabric member 22. Also, it should be understood that identical folding guide structures may be provided to the fabric member 24 as those provided to the fabric member 22.

Figure 8:
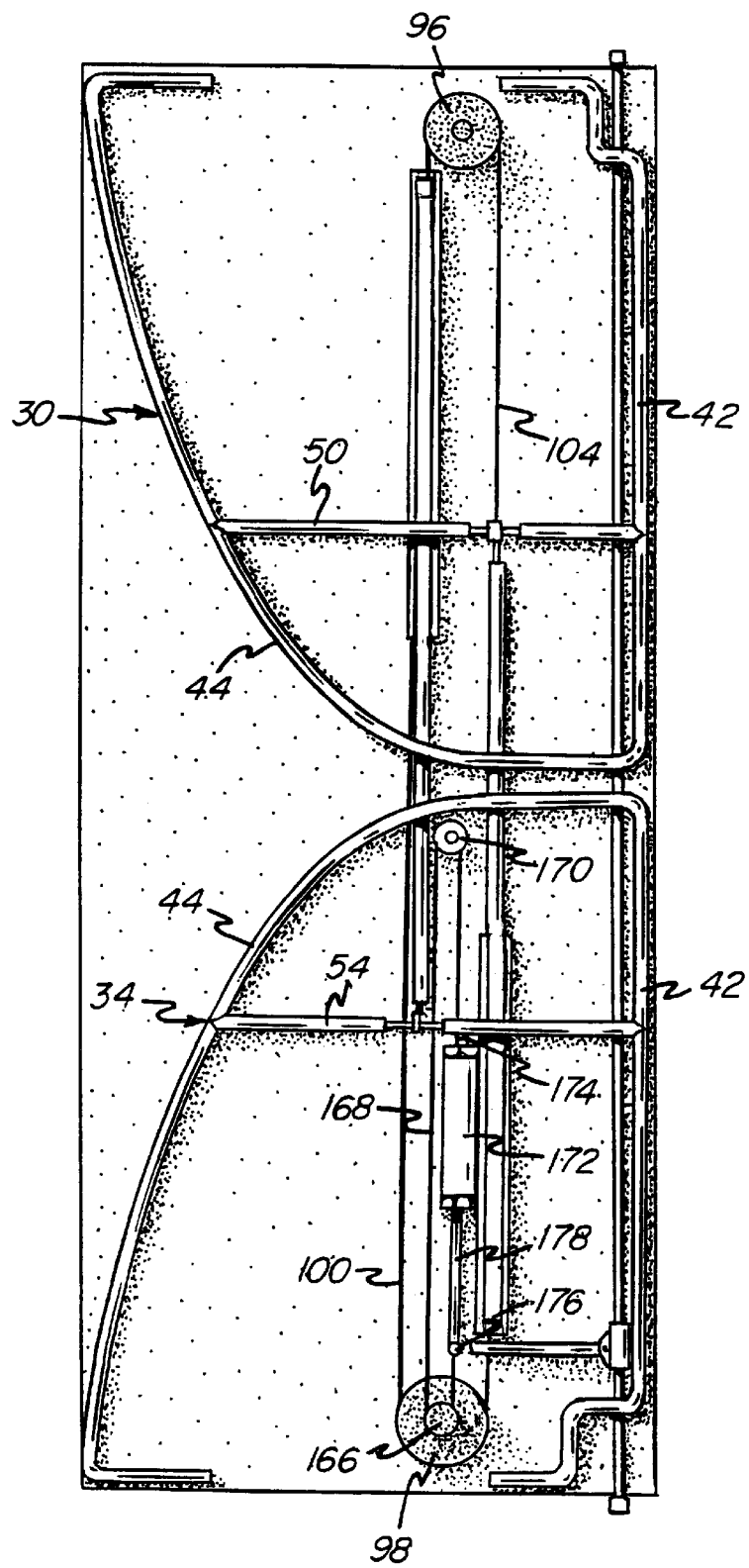
FIG. 8 is an elevational view of the left hand side frame structure illustrating an alternative actuation mechanism for the airfoil.

Referring to FIG. 8, an alternative actuator for actuating the first and second frame structures 26, 28 to both the deployed and folded configurations is illustrated with reference to the left hand pair of frame members 30, 34. The elements of the frame structure of FIG. 8 corresponding to the frame structure embodiment shown in FIG. 3 are designated with the same reference numerals.

In the present embodiment of the actuator, the drive circuit defined by the upper and lower cables 100, 104 are driven in movement by a mechanism for driving the lower pulley 98 in rotation. Specifically, the lower pulley 98 is provided with a supplemental, drive pulley 166, and a V-belt 168 extends around the drive pulley 166 and an upper pulley 170. Opposing ends of the V-belt 168 are attached to opposing ends of a pneumatically driven linear actuator 172 at belt end connections 174, 176 defined on opposing ends of the actuator piston shaft 178.

Thus, as the piston shaft 178 is driven upwardly, the belt 168 will cause the pulley 98 to rotate counterclockwise to deploy the upper and lower frame members 30, 34. Alternatively, when the piston shaft 178 is driven downwardly, the pulley 98 will turn clockwise to retract the frame members 30, 34 to the folded configuration.

Figure 9:
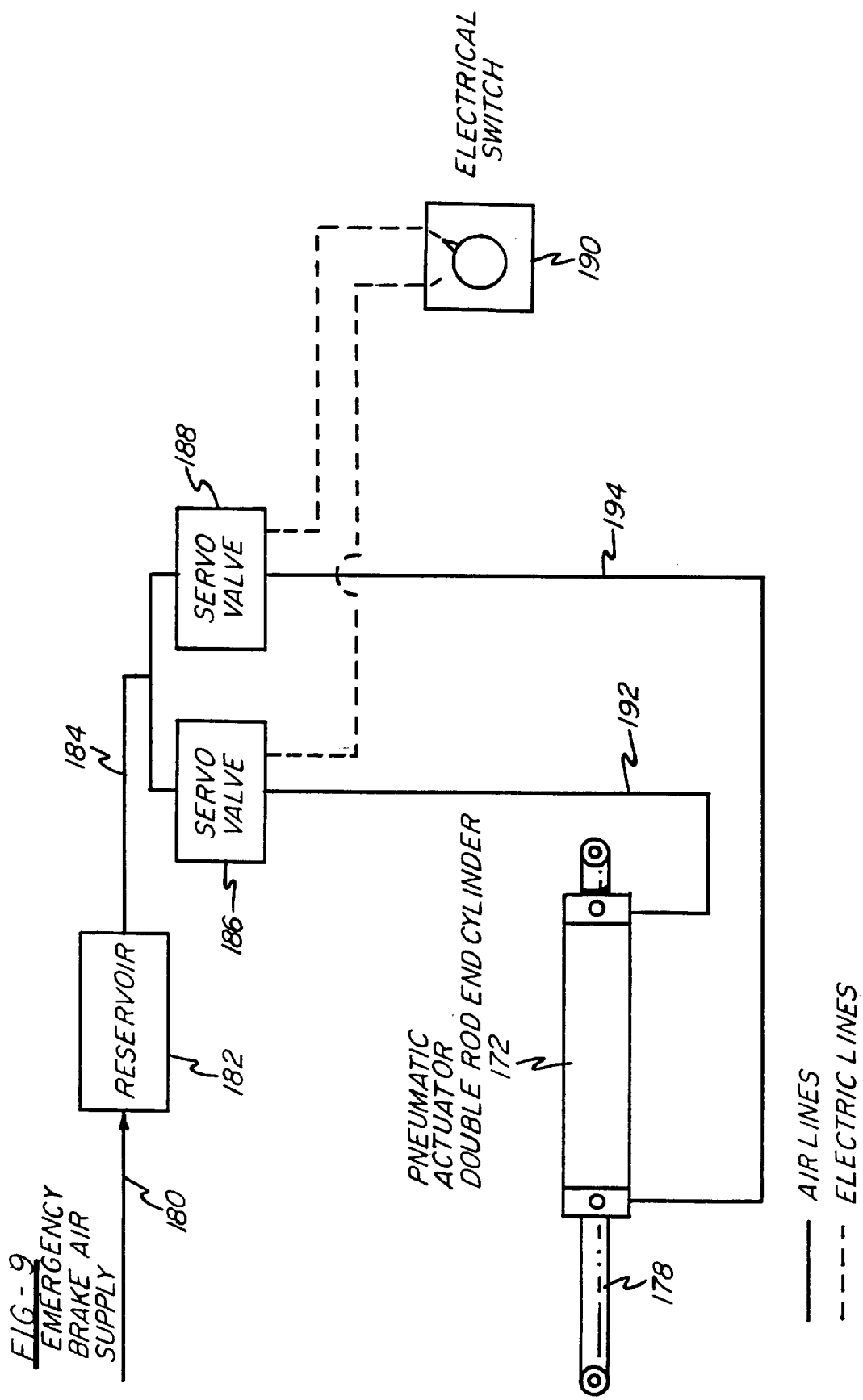
FIG. 9 is a schematic of the pneumatic system for actuating the embodiment of FIG. 8.

FIG. 9 illustrates schematically a system for actuating the pneumatic actuator 172 based on an emergency brake air supply system of a conventional truck. Air from the truck is supplied through a line 180 to an air reservoir 182. Air from the reservoir is supplied through a line 184 to a pair of solenoid operated servo valves 186, 188 wherein the servo valves 186, 188 may be alternately actuated by an electrical switch 190 which may be located within the cab of the truck. The servo valves 186, 188 are connected through lines 192, 194, respectively to opposing ports on the pneumatic actuator 172 for alternately actuating the upper and lower frame members 30, 34 to deploy or retract.

Figure 10:
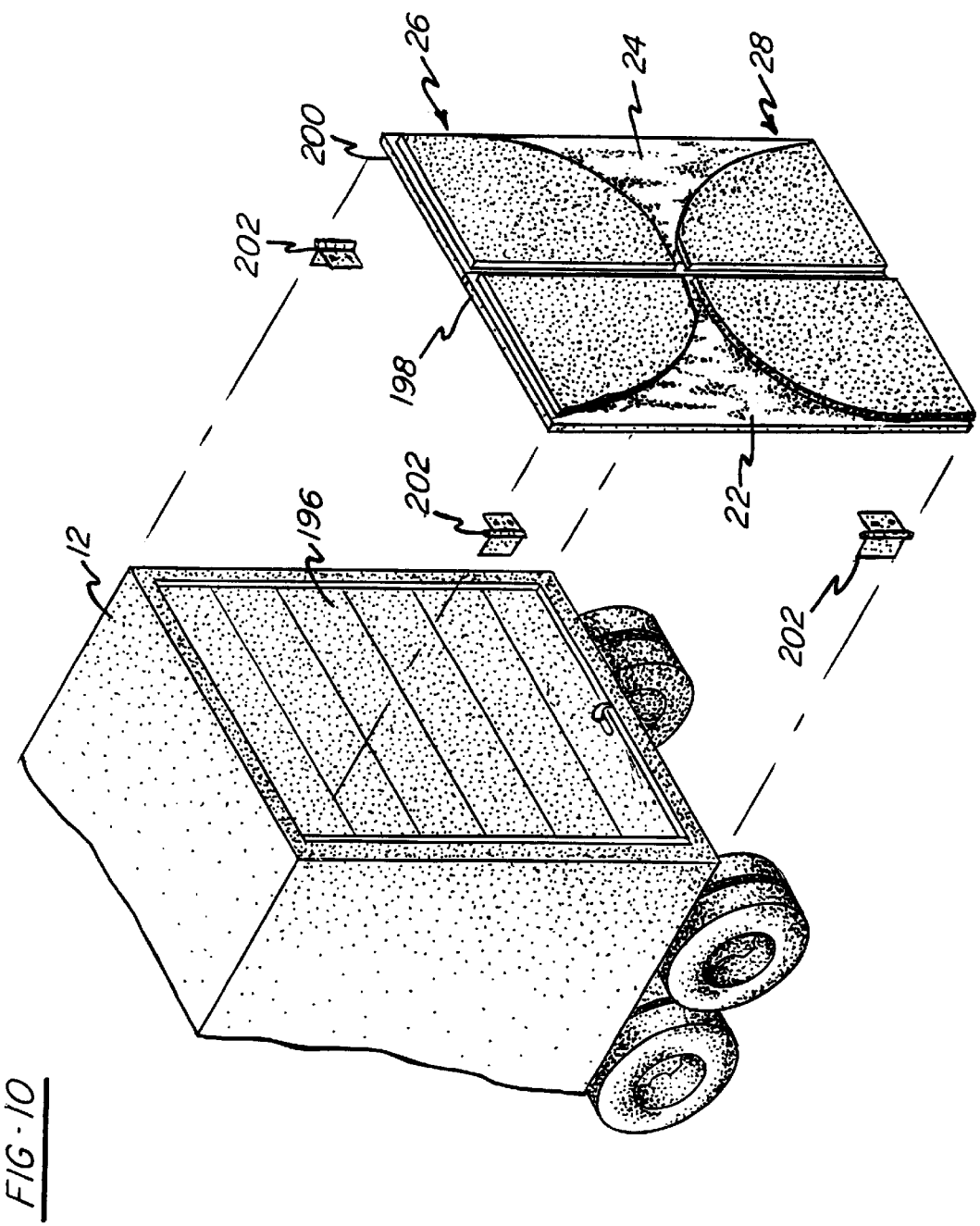
FIG. 10 is a rear perspective view illustrating an embodiment of the airfoil for attachment to a truck having a roll up rear door.

Referring to FIG. 10, an alternative configuration for the airfoil of the present invention is illustrated for use with a truck 12 having a roll-up back door 196. In this embodiment, the first and second frame structures 26, 28 are mounted to a pair of door panels comprising a left hand door panel 198 and a right hand door panel 200. The door panels 198, 200 are adapted to be mounted by hinges 202 to side edges of the truck 12. Thus, the door panels 198, 200 may be swung out of the way of the roll-up door 196 when it is necessary to access the interior of the truck. Further, it should be understood that the frame structures 26, 28 may be comprised of the same elements as described for the embodiments of FIGS. 3 and 8 for deploying and retracting the elements of the airfoil.

Figure 11:
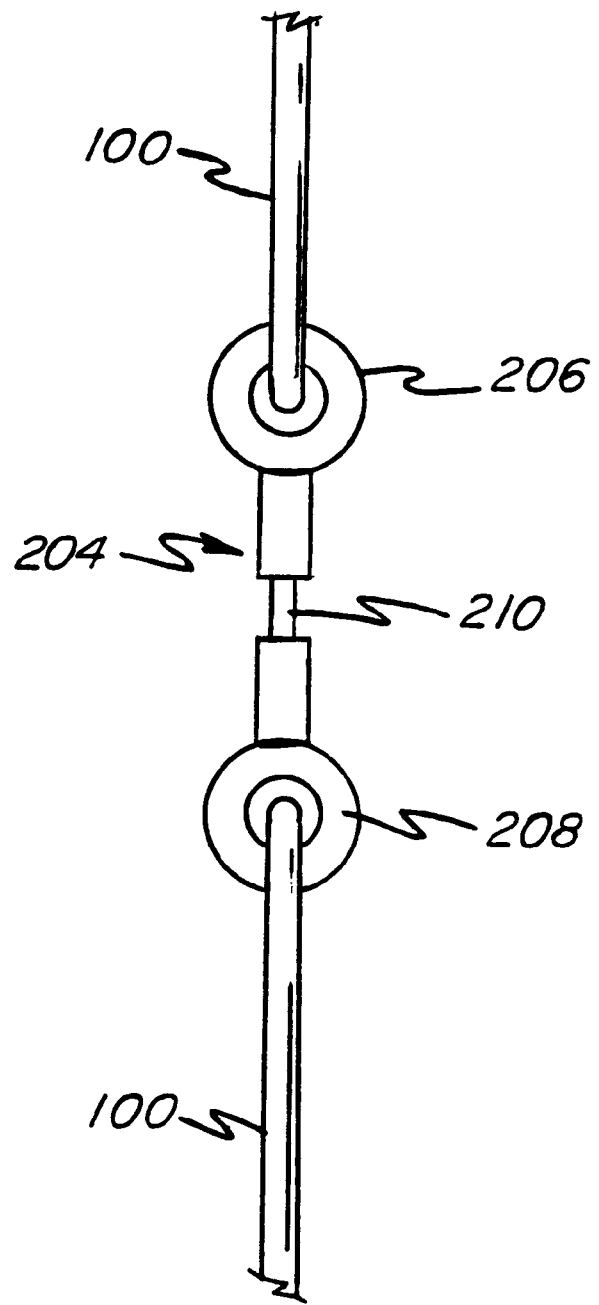
FIG. 11 is a view of a portion of cable for the actuation mechanism including a shear element.

Referring to FIG. 11, a modification to the embodiments of the present invention is illustrated and comprises a tensile element 204 which may be connected to either one of the upper or lower cable sections 100, 104, and in the present illustration is shown connected to the cable section 100. The tensile element 204 includes opposing ends 206, 208 which are connected within the length of the cable 100. The tensile element 204 includes a shear portion 210 having a tensile strength less than the tensile strength of the cable 100. Thus, if a force is applied to the airfoil, such as an impact force, the shear portion 210 may shear causing a break in the cable 100 and thereby permitting collapse of the airfoil.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A deployable airfoil to reduce wind resistance of trucks and semi-trailers having a substantially planar rear surface defining a plane, the airfoil comprising:

first and second substantially rigid frame structures supported at the plane of the rear surface;

each frame structure having a proximal edge pivotally mounted adjacent to the plane of the rear surface and a distal edge movable outwardly from a location adjacent the plane of the rear surface to a location distal from the plane of the rear surface;

a flexible fabric structure attached to the distal edges and extending between the first and second frame structures;

a connecting structure between the first and second frame structures whereby the frame structures are connected to pivot simultaneously outwardly to move the fabric structure from a folded configuration adjacent to the plane of the rear surface to a deployed configuration where the fabric structure is substantially taut between the first and second frame structures; and wherein the distal edges of the frame structures pivot outwardly in opposite directions during movement from the folded configuration to the deployed configuration.

2. The airfoil of claim 1 wherein the connecting structure comprises first and second elongated lever structures connected to the first and second frame structures, respectively, the first and second lever structures each including a proximal end supported for movement adjacent to the plane of the rear surface and a distal end attached to a respective frame structure.

3. The airfoil of claim 2 including a flexible structure extending between the proximal ends of the lever structures whereby the proximal ends of the lever structures are connected for simultaneous linear movement parallel to the plane of the rear surface.

4. The airfoil of claim 2 wherein the proximal ends of the first and second lever structures move toward each other during movement from the folded configuration to the deployed configuration.

5. The airfoil of claim 3 including an actuator operatively connected to the connecting structure for actuating the first and second frame structures to move from the folded configuration to the deployed configuration.

6. The airfoil of claim 5 wherein the actuator comprises a strap structure connected to the flexible structure and changing the length of the strap exerts a force to move the first and second frame structures from the folded to the deployed configuration.

7. The airfoil of claim 5 wherein actuator comprises a fluid driven actuator connected to the flexible structure.

8. The airfoil of claim 1 wherein the first and second frame structures each comprise a pair of frame members, the frame members of the first frame structure being movable independently of each other and the frame members of the second frame structure being movable independently of each other.

9. The airfoil of claim 8 wherein one of the frame members of each of the first and second frame structures comprise upper frame members supported for pivotal movement about an upper horizontal pivot axis, and one of the frame members of each of the first and second frame structures comprise lower frame members supported for pivotal movement about a lower horizontal pivot axis.

10. A deployable airfoil to reduce wind resistance of trucks and semi-trailers having a substantially planar rear surface defining a plane, the airfoil comprising:

a left-hand and a right-hand pair of frames, each pair of frames comprising a first, upper frame member and a second, lower frame member supported at the plane of the rear surface;

each of the upper frame members supported at an upper pivot connection for pivotal movement about an upper pivot axis at a proximal edge of the upper frame members;

each of the lower frame members supported at a lower pivot connection for pivotal movement about a lower pivot axis at a proximal edge of the lower frame members;

each of the upper and lower frame members including a distal edge wherein the distal edges of the upper and lower frame members move in opposite directions, away from each other, during pivotal movement of the frame members outwardly away from a location adjacent the plane of the rear surface; and a flexible fabric member attached to and extending between the distal edges of each of the pairs of the upper and lower frame members wherein outward pivotal movement of the upper and lower frame members causes the fabric members to move from a folded configuration adjacent the plane of the rear surface to a deployed configuration where the fabric members are substantially taut between the respective upper and lower frame members.

11. The airfoil of claim 10 including a pair of upper frame levers, each upper frame lever including a distal end attached to a respective upper frame member, and a pair of lower frame levers, each lower frame lever including a distal end attached to a respective lower frame member wherein each of the upper and lower frame levers includes a proximal end guided for substantially linear movement adjacent the plane of the rear surface.

12. The airfoil of claim 11 including means for actuating the proximal ends of the upper and lower frame members in movement whereby the distal ends of the upper and lower frame members apply a force to the respective upper and lower frame members to cause the frame members to move the fabric members from the folded configuration to the deployed configuration.

13. The airfoil of claim 12 including a left-hand cable connecting the proximal ends of the frame levers for the left-hand pair of frames whereby the left-hand pair of frames are connected to move simultaneously, and a right-hand cable connecting the frame levers for the right-hand pair of frames whereby the right-hand pair of frames are connected to move simultaneously.

14. The airfoil of claim 13 including a shear pin attached to the cables between the upper and lower frame members of each of the left-hand and right-hand pairs of frames wherein the shear pins have a tensile strength which is less than the tensile strength of the cables.

15. The airfoil of claim 10 including a stiffening panel on each of the fabric members wherein the stiffening panels are formed of a material having a greater stiffness to bending than the material of the fabric members.

16. The airfoil of claim 15 wherein the stiffening panels have a directionally dependent differential stiffness such that the stiffening panels present a greater resistance to bending about a horizontal axis than a resistance to bending about a vertical axis.

17. A deployable airfoil to reduce wind resistance of trucks and semi-trailers having a substantially planar rear surface, the airfoil comprising:

a left-hand and right-hand pair of frames, each pair of frames comprising a first, upper frame member and a second, lower frame member supported at the rear surface of a vehicle for pivotal movement about horizontal axes wherein the horizontal axis for the upper frame member is located adjacent an upper edge of the rear surface and the horizontal axis for the lower frame member is located adjacent a lower edge of the rear surface;

each frame member defining three edges including a substantially straight pivot edge adjacent and parallel its respective horizontal axis, a substantially straight central edge extending perpendicularly from an end of the pivot edge adjacent a central portion of the rear surface, and an arcuate edge extending between the pivot edge and the central edge;

a fabric member attached to and extending between the arcuate edges of the upper and lower frame members of each pair of frame members;

an upper frame lever including a proximal end having a rolling member supported adjacent the rear surface and a distal end pivotally attached to the upper frame member;

a lower frame lever including a proximal end having a rolling member supported adjacent the rear surface and a distal end pivotally attached to the lower frame member;

an upper frame lever guide mounted to the rear surface, the upper frame lever guide comprising a channel member receiving and guiding the upper frame rolling member in linear vertical movement along the rear surface;

an lower frame lever guide mounted to the rear surface, the lower frame lever guide comprising a channel member receiving and guiding the lower frame rolling member in linear vertical movement along the rear surface;

an upper pulley located on the rear surface adjacent an upper end of the lower frame lever guide;

a lower pulley located on the rear surface adjacent a lower end of the upper frame lever guide;

an upper cable section extending around the upper pulley from the lower frame rolling member to the upper frame rolling member;

a lower cable section extending around the lower pulley from the upper frame rolling member to the lower frame rolling member whereby the upper and lower cable sections form a drive circuit for simultaneously moving the upper frame rolling member and lower frame rolling member;

an actuator connected to the drive circuit, the actuator causing movement of the drive circuit whereby the proximal ends of the upper and lower frame levers are driven in sliding movement along the upper and lower frame lever guides, respectively, to cause the upper and lower frame members to pivot outwardly from the rear surface; and wherein outward pivotal movement of the pairs of upper and lower frame members causes the respective fabric members to moved from a folded configuration adjacent to the rear surface to a deployed configuration where the fabric members are substantially taut in the vertical direction and define a curved surface around the rear surface.

18. A deployable airfoil to reduce wind resistance of trucks and semi-trailers having a substantially planar rear surface defining a plane, the airfoil comprising:

first and second substantially rigid frame structures supported at the plane of the rear surface;

each frame structure having a proximal edge pivotally mounted adjacent to the plane of the rear surface and a distal edge movable outwardly from a location adjacent the plane of the rear surface to a location distal from the plane of the rear surface;

folding structure extending between the first and second frame structures;

a connecting structure between the first and second frame structures whereby the frame structures are connected to pivot simultaneously outwardly to move the folding structure from a folded configuration adjacent to the plane of the rear surface to a deployed configuration where the folding structure is unfolded extending between the first and second frame structures; and wherein the distal edges of the frame structures pivot outwardly in opposite directions during movement from the folded configuration to the deployed configuration.

19. The airfoil of claim 18 wherein said folding structure comprises a flexible fabric structure and said movement to a deployed configuration comprises moving said fabric structure to be substantially taut between said first and second frame structures.

* * * * *